Figure 1:
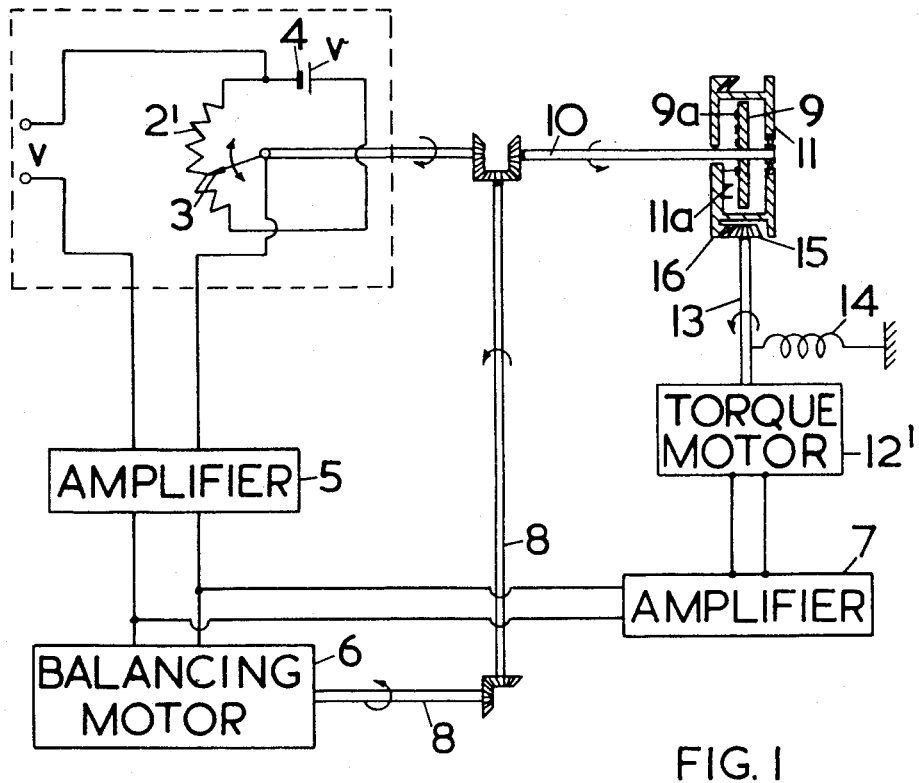

Sept. 12, 1961  L. AIREY  2,999,965
ELECTRICAL MEASURING SERVOSYSTEM
Filed April 28, 1959  2 Sheets-Sheet 1

Leslie Airey
Inventor
By Cushman, Darby & Cushman
Attorney

Sept. 12, 1961  L. AIREY  2,999,965
ELECTRICAL MEASURING SERVOSYSTEM
Filed April 28, 1959  2 Sheets-Sheet 2

United States Patent Office 2,999,965
Patented Sept. 12, 1961

2,999,965
ELECTRICAL MEASURING SERVOSYSTEM
Leslie Airey, Cove, near Farnborough, England, assignor to National Research Development Corporation, London, England, a British corporation
Filed Apr. 28, 1959, Ser. No. 809,427
Claims priority, application Great Britain May 1, 1958
2 Claims. (Cl. 318—28)

This invention relates to electrical measuring instruments designed to operate on the feed back principle. The feed back principle as applied to electrical measuring instruments refers to the technique of measurement in which the lack of equality between an input signal to be measured and a locally generated signal is fed back as an out of balance signal to a driving mechanism which is thereby operated to reduce this inequality to zero whilst the extent of movement of the driving mechanism is used to give a measure of the input signal. Such a measure may be given by causing the driving mechanism to move an indicator over a calibrated scale. Electrical measuring instruments of this kind have been fitted with digital encoders with a view to providing a digitized response, or output mainly to facilitate recording and computation of measurements made.

However, any electrical measuring device operating on this principle will, when the input signal is varying with time, exhibit a lag in response. That is, when the driving mechanism is moving to effect equality, or balance, of the input signal and locally generated signal, the input signal must always exceed the fed back signal otherwise, by definition, the condition of balance has been established. In instruments having an appropriate speed of response, e.g. corresponding to full traverse of the indicator over its calibrated scale in, perhaps less than 1 second, such lags may be typically of the order of 1 to 3% of full scale.

Lag of this order is unacceptable in many applications of measurement.

It is an object of the invention to provide means whereby such lag, in the case of digitised instruments, is reduced.

It is a further object of the invention to enhance the versatility of these instruments so that they can be used, not only to measure successively a number of electrical signals when a state of balance is achieved, but, also, to permit of their being used for following an input signal, which is varying with time, with improved accuracy.

According to the invention, in an electrical measuring instrument operating on the feed back principle and having a response which is digitised by relative movement between a coded element and a reading element, one element being movable in response to an out of balance signal, the error due to lag during changes of the out of balance signal is reduced by causing the other element to be moved in proportion to the out of balance signal in appropriate ratio and sense.

Such an instrument may have its response digitised by having its driving mechanism (operable only in response to out of balance signal), connected to drive one element of a digital encoder and further driving means also responsive to any out of balance signal connected to drive or to move the other element of the encoder but in opposite sense so that the output or indication of the encoder at any instant is the algebraic sum of both movements.

The said other element is preferably driven against a restoring force which limits the displacement of that element such that its rate of displacement is that required to compensate for lag and which force restores said other element to its datum position immediately the equality between the signals is achieved and the out of balance signal disappears.

Alternatively the said other element may be driven or moved by a resolver or synchro energised by the out of balance signal appropriately modified for this purpose to give the required movement to that element.

One embodiment of the invention will now be described with reference to the accompany drawing which shows diagrammatically in FIGURE 1 the application of the invention to a self balancing potentiometer, in FIGURE 2 a graphical indication of the improved result given by the arrangement shown in FIGURE 1 and in FIGURE 3 a modification of the encoder shown in FIGURE 1.

Referring firstly to FIGURE 1, there is shown a conventional self balancing potentiometer 1, being an electrical measuring instrument operating on the feed back principle. In this case, an input signal V is applied to the arcuate potentiometer winding 2 through its rotary contact arm 3, a locally generated signal v being applied across the winding 2, from battery 4. The electrical output from the potentiometer 1 is amplified in amplifier 5 and, after amplification, is applied to balancing motor 6 and a further amplifier 7. The balancing motor 6 drives through shafting 8 the rotary contact arm 3 of the potentiometer whenever an out of balance exists to move the contact arm 3 in a sense to reduce this inequality to zero. The potentiometer 1 shown has a digital encoder whereby the movement of the contact arm may be presented in digital form. In this example the encoder could be of the Petherick type described in British Patent No. 808,564 or No. 762,284 having a coded disc 9 mounted for rotation by shaft 10 within a housing 11. The coded disc 9 has a pattern of electrically conducting or insulating sectors 9a. On rotation, the electrical contact strips 9a move over a normally fixed brush carrying member 11a which, in the case of this encoder, is carried by the housing 11.

In the present example, the further amplified output of the potentiometer is applied to a torque motor 12 as shown having an armature shaft 13 rotatably restrained by a spring 14. The armature shaft 13 carries a bevel gear 15 which meshes with a bevel gear segment 16 attached to the housing 11 of the encoder, so that on energization of the torque motor 12 the housing 11 is rotated about the axis of the disc 9 but in the opposite sense to shaft 10.

Figure 2:
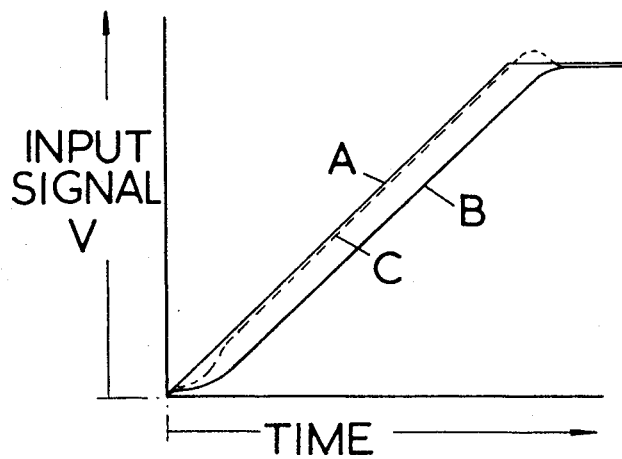

Thus, if the input signal V to the potentiometer as represented, for example by the output of a strain gauge assembly, varies with time as indicated by the curve A on the diagram shown in FIGURE 2, the potentiometer contact arm 3 will follow the signal, insofar as it represents an out of balance signal with respect to the locally generated signal $v$, but with a lag indicated in FIGURE 2 by the curve B. The degree of lag will be approximately proportional to the rate of change of the input signal V, being due to the power requirements of the balancing motor to overcome frictional effects and to a lesser extent to overcome inertia. By applying the amplified out of balance signal through the balancing motor 6 to drive the coded disc 9 of the encoder and to the potentiometer contact arm 3 simultaneously, a continuous digital representation of the feedback signal may be obtained but this representation incorporates the inherent lag which may be of the order of 1 to 2% of full scale.

However, as described above, a further signal proportional to the out of balance signal is applied to the torque motor 12 to drive the brush carrying member 11a in opposite sense to the coded disc 9, by an amount proportional to the feedback signal; the spring 14 and the torque motor current is so selected to give the required degree of proportionality. The output of the encoder at any instant of time is thus the algebraic sum of a rotation of the coded disc with respect to the normally fixed datum or zero position of the brush carrying member 11a and a displacement of the brush carrying member proportional to instrument lag. In this way the ultimate response of the encoder (for the present purposes) during the subsistence of an out of balance current will more nearly follow the varying input and will approximate to the curve C shown in FIGURE 2.

When the out of balance signal is reduced to zero the torque motor field collapses and the spring 14 restores the brush carrying member to its zero defining position, substantially instantaneously.

Figure 3:
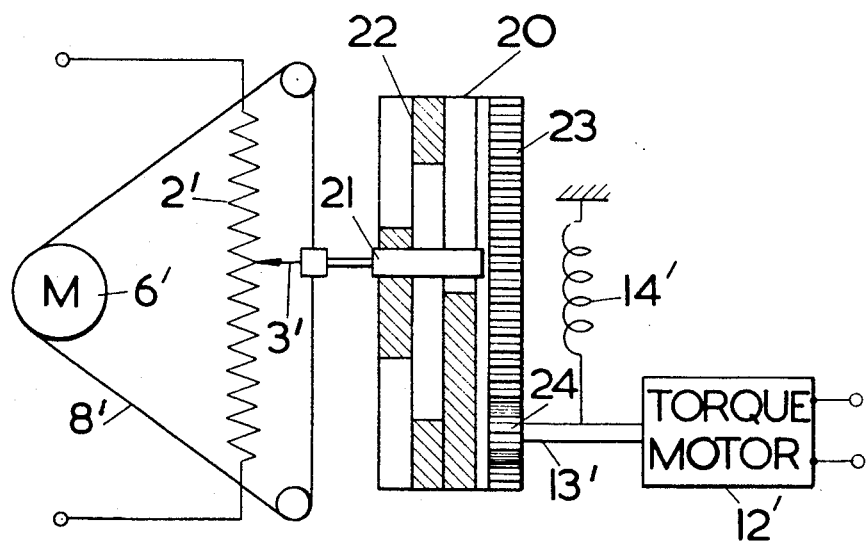

FIGURE 3 shows diagrammatically one way of modifying the arrangement of FIGURE 1 to adapt that arrangement to an encoder with linear type scales conveniently usable on an instrument embodying a linear potentiometer. In FIGURE 3 similar parts are employed to those shown in FIGURE 1 except that the potentiometer has a linear winding $2^1$ with a contact arm $3^1$ mounted for linear movement being driven by balancing motor $6^1$ through pulley and wire drive $8^1$ in conventional manner. The movement of the contact arm $3^1$ is digitised by means of an encoder 20 having as a brush carrying member 21 an extension of the contact arm $3^1$, the member 21 co-operating with a linearly coded scale 22 of the encoder 20.

A marginal portion 23 of the encoder is provided with rack teeth which are engaged by pinion 24 secured to shaft $13^1$ of torque motor $12^1$. The latter is energised in response to a feed back signal as before; rotational movement of the shaft 13 being under the restraint of a spring $14.^1$ In the above described example and the modification thereto the degree of energisation of the torque motor and the strength of the retaining spring determine the displacement of one of the elements of the encoder. However this arrangement could be further modified by replacing the torque motor and spring by a synchro having an output torque shaft mechanically connected to that element of the encoder to which the lag correction displacement is applied. The rotational position of the synchro torque shaft is determined by the value of input signals into its two windings connected to the amplifier as at 7. The latter is in this instance designed to produce two signals which, when there is a zero feed back signal, are equal and maintain the synchro torque shaft in a position corresponding to such as gives no lag correction on the encoder. The design of the amplifier is such however that when a feed back signal is applied to it the signal in one or other of the synchro windings is increased giving an appropriate rotational displacement to the synchro torque shaft such as will compensate for instrument lag at the encoder.

Whilst the invention has been described above in an application to self-balancing potentiometers, it will be understood that the method of lag correction is equally applicable to other feed back instruments for example self-balancing bridge circuits. For example, in a D.C. bridge circuit, the resistance of one arm of which varies with quantity to be measured, e.g. as in a strain gauge bridge, two of the other arms include a fixed resistor and the fourth a variable resistor. The output of the bridge is applied to a balancing motor drivingly connected to the slider of the variable resistor. The slider movement is digitized in the manner indicated above with reference to FIGURE 3. In the case of a self-balancing A.C. bridge the output signal from the bridge is first applied to a phase sensitive rectifier to sense the phase of the out-of-balance current prior to its being passed to an amplifier and thence to the balancing motor driving the variable resistance. Alternatively the output signal is first amplified and then together with a reference A.C. signal of the same frequency but 90° out of phase energises a two phase A.C. motor which acts as a phase sensitive discriminator to sense the phase of the current and drives the variable resistance accordingly.

I claim:

1. In an electrical instrument comprising a digital encoder having an input member and a carrier member, said carrier member having spring means normally holding it in a datum position, and a self balancing negative feed back servo system including a drive motor connected to be operated in accordance with the degree of unbalance of the system and connected mechanically to drive the input member of the digital encoder, the provision of a second drive motor connected electrically to be operated in accordance with the degree of unbalance of the system and connected mechanically to drive the carrier member against its spring influence in the opposite sense to that in which the input member is driven.

2. An electrical instrument as claimed in claim 1 in which the self balancing negative feed back servo system comprises an amplifier, a source of electricity, an adjustable potentiometer having its resistance element connected across said source, said potentiometer being connected in series opposition with the input of said first amplifier to apply to the latter a difference signal, a drive motor connected electrically the output of said amplifier to be operated thereby and connected mechanically to said potentiometer to adjust the latter in the sense to reduce the difference signal, and the output of the amplifier of the servo system is connected to the input of a second amplifier the output of which is electrically connected to the second drive motor.

References Cited in the file of this patent
UNITED STATES PATENTS 2,533,079    Suebolz    Dec. 5, 1950
2,866,180    Rudolph    Dec. 23, 1958